United States Patent
Branson et al.

(10) Patent No.: US 9,256,640 B2
(45) Date of Patent: *Feb. 9, 2016

(54) STREAMING DELAY PATTERNS IN A STREAMING ENVIRONMENT

(71) Applicant: International Business Machines Corporation, Armonk, NY (US)

(72) Inventors: Michael J. Branson, Rochester, MN (US); Bradford L. Cobb, Cedar Park, TX (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 339 days.

This patent is subject to a terminal disclaimer.

(21) Appl. No.: 13/795,997

(22) Filed: Mar. 12, 2013

(65) Prior Publication Data
US 2014/0236920 A1 Aug. 21, 2014

Related U.S. Application Data

(63) Continuation of application No. 13/773,008, filed on Feb. 21, 2013.

(51) Int. Cl.
*G06F 15/16* (2006.01)
*G06F 17/30* (2006.01)
*H04L 29/06* (2006.01)

(52) U.S. Cl.
CPC .......... *G06F 17/30442* (2013.01); *H04L 65/60* (2013.01)

(58) Field of Classification Search
CPC .............. G06F 17/30516; G06F 17/30442; G06F 11/00; H04L 47/10; H04L 47/2416; H04L 49/90; H04W 28/10
USPC ......................................... 709/224; 370/252
See application file for complete search history.

(56) References Cited

U.S. PATENT DOCUMENTS

| | | | |
|---|---|---|---|
| 7,613,848 B2 | 11/2009 | Amini et al. | |
| 7,644,110 B2 | 1/2010 | Nishizawa et al. | |
| 8,095,690 B2 | 1/2012 | Kashiyama et al. | |
| 8,260,768 B2 | 9/2012 | Wang et al. | |
| 2003/0235196 A1* | 12/2003 | Balachandran et al. | 370/392 |
| 2007/0153695 A1* | 7/2007 | Gholmieh et al. | 370/235 |
| 2007/0288635 A1* | 12/2007 | Gu et al. | 709/226 |

(Continued)

OTHER PUBLICATIONS

Carriero Jr, N. "Implementation of Tuple Space Machines", Dec. 9, 2007, (Original Dec. 31, 1987), pp. 1-93, IP.com Prior Art Database.

(Continued)

*Primary Examiner* — Brian J Gillis
*Assistant Examiner* — Shean Tokuta
(74) *Attorney, Agent, or Firm* — Jonathan V. Sry; James R. Nock

(57) ABSTRACT

The method and system receive streaming data to be processed by a plurality of processing elements comprising one or more stream operators. One embodiment is directed to a method and a system for managing processing in a streaming application. A stream operator may select a delay pattern. The stream operator may compare one or more performance factors from the delay pattern to one or more optimal performance factors. The stream operator may delay the stream of tuples using the delay pattern if the performance factors are determined by the optimal performance factors.

16 Claims, 8 Drawing Sheets

(56) References Cited

U.S. PATENT DOCUMENTS

| | | | |
|---|---|---|---|
| 2008/0005391 A1 | 1/2008 | Gedik et al. | |
| 2008/0288518 A1* | 11/2008 | Matsuo et al. | 707/101 |
| 2008/0313385 A1* | 12/2008 | Vijayakumar et al. | 711/100 |
| 2009/0262749 A1* | 10/2009 | Graumann et al. | 370/412 |
| 2009/0271529 A1* | 10/2009 | Kashiyama et al. | 710/1 |
| 2009/0300615 A1* | 12/2009 | Andrade et al. | 718/100 |
| 2009/0313614 A1* | 12/2009 | Andrade et al. | 717/151 |
| 2010/0124886 A1 | 5/2010 | Fordham et al. | |
| 2010/0131543 A1* | 5/2010 | Chkodrov et al. | 707/765 |
| 2010/0293535 A1* | 11/2010 | Andrade et al. | 717/156 |
| 2011/0041133 A1* | 2/2011 | Amini et al. | 718/102 |
| 2011/0060595 A1 | 3/2011 | Trainor | |
| 2012/0137178 A1 | 5/2012 | Barsness et al. | |
| 2012/0218268 A1 | 8/2012 | Accola et al. | |
| 2013/0016765 A1* | 1/2013 | Park et al. | 375/224 |
| 2013/0254373 A1 | 9/2013 | Cockrell | |
| 2013/0290367 A1* | 10/2013 | Kashiyama | 707/769 |
| 2014/0156707 A1* | 6/2014 | Sax et al. | 707/798 |
| 2014/0350990 A1 | 11/2014 | Zeng et al. | |

OTHER PUBLICATIONS

Ballard et al., "IBM InfoSphere Streams: Harnessing Data in Motion", Sep. 2010. 360 pages, IBM Redbooks. http://www.redbooks.ibm.com/abstracts/sg247865.html.

\* cited by examiner

STREAMING DELAY PATTERNS IN A STREAMING ENVIRONMENT

CROSS-REFERENCE TO RELATED APPLICATIONS

This application is a continuation of co-pending U.S. patent application Ser. No. 13/773,008, filed Feb. 21, 2013. The aforementioned related patent application is herein incorporated by reference in its entirety.

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, and system for processing data. The method and system receive streaming data to be processed by a plurality of processing elements comprising one or more stream operators.

One embodiment is directed to a method for managing processing in a streaming application. A stream operator may select a delay pattern. The stream operator may compare one or more performance factors from the delay pattern to one or more optimal performance factors. The stream operator may use the delay pattern on the stream of tuples if the performance factors are determined by the optimal performance factors.

Another embodiment is directed to a system for managing processing of a stream of tuples. The aggregate stream operator may receive a stream of tuples from one or more input stream operators. A monitor may measure one or more performance factors. The aggregate stream operator may receive the measured performance factors from the monitor and compare the measured performance factors with the optimal performance factors and select a delay pattern based on the comparison.

Another embodiment is directed to a method for managing processing in a streaming application. The stream manager may determine if the streaming application is in a constrained environment. The stream manager may predict a performance factor for a delay pattern. The prediction may be determined by presence of the constrained environment. The stream manager may select an optimal delay pattern that is determined by the performance factor. The stream operator may delay the processing at the aggregate stream operator using the optimal delay pattern.

BRIEF DESCRIPTION OF THE DRAWINGS

Like reference numbers and designations in the various drawings indicate like elements.

DETAILED DESCRIPTION

Figure 1:
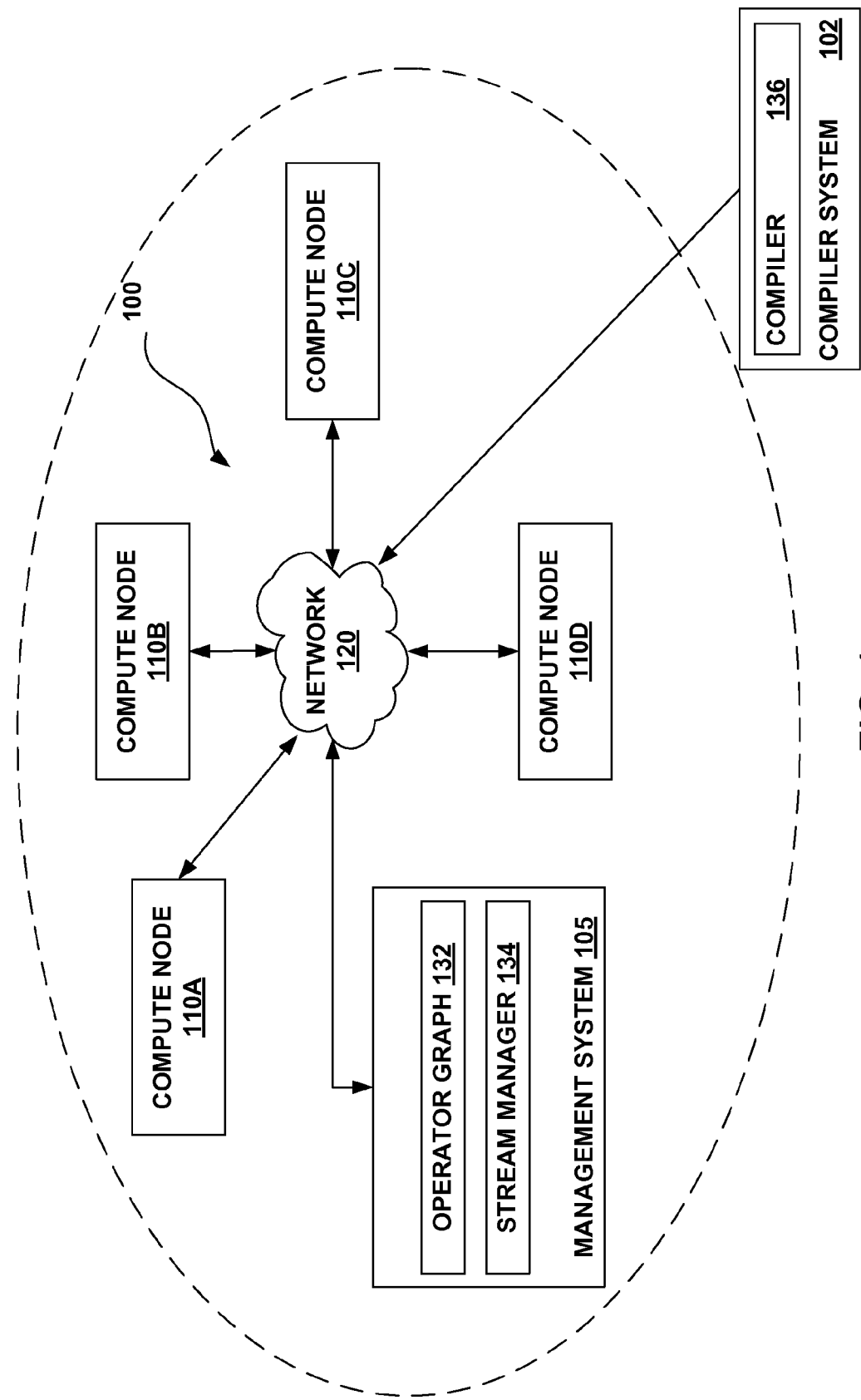
FIG. 1 illustrates a computing infrastructure configured to execute a stream computing application, according to various embodiments.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream-based computing application, stream operators are connected to one another such that data flows from one stream operator to the next (e.g., over a TCP/IP socket). Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application.

A "tuple" is data. More specifically, a tuple is a sequence of one or more attributes associated with an entity. Examples of attributes may be any of a variety of different types, e.g., integer, float, Boolean, string, etc. The attributes may be ordered. A tuple may be extended by adding one or more additional attributes to it. In addition to attributes associated with an entity, a tuple may include metadata, i.e., data about the tuple. As used herein, "stream" or "data stream" refers to a sequence of tuples. Generally, a stream may be considered a pseudo-infinite sequence of tuples.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second.

A tuple may be received by a stream operator. In some embodiments, the stream operator may process the tuple after an aggregate of tuples are received, e.g., an aggregate stream operator that adds values from one or more stream operator inputs. An aggregate may be interpreted to mean a group of tuples assembled for a particular purpose, according to some embodiments. The stream operator may control when the processing occurs by introducing delays, i.e., delaying either the processing or the transmission to subsequent stream operators. A pattern of delays, or "delay pattern", may result in performance improvements of the application by reducing the amount of processing that a stream operator has to perform during constrained environments. For example, delaying processing operations may reduce the processing demand and allow the user to deactivate CPU cores and reduce power consumption. An optimal delay pattern may be a delay pattern that improves performance of the operator graph or the computing infrastructure and may be determined by examining performance factors and comparing the measured performance factors to optimal performance factors (described more fully in FIG. 6). The present disclosure may be directed to selecting between the delay patterns of the stream computing application.

FIG. 1 illustrates one exemplary computing infrastructure 100 that may be configured to execute a stream-based computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 2:
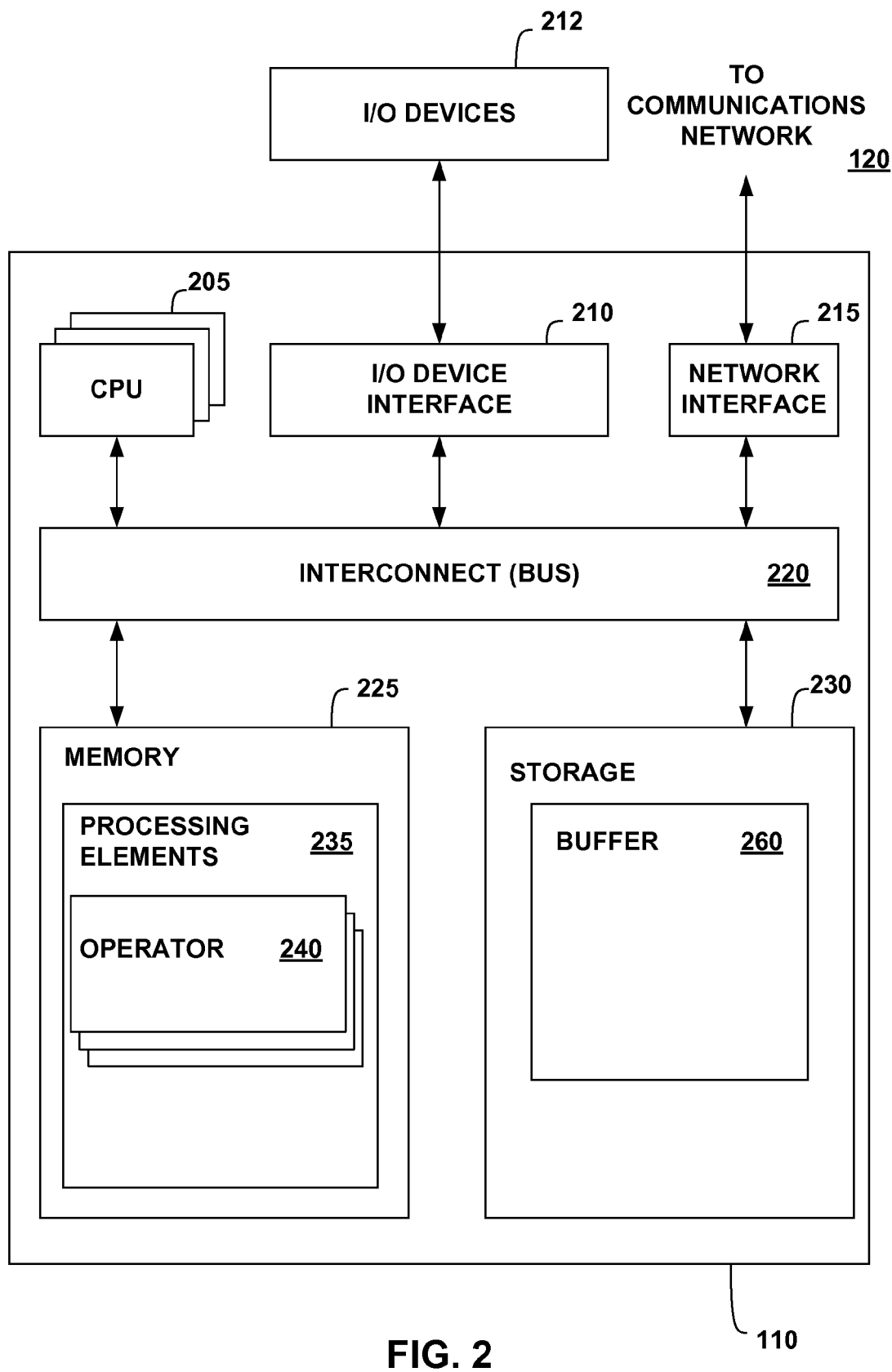
FIG. 2 illustrates a more detailed view of a compute node of FIG. 1, according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A streams application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

Figure 3:
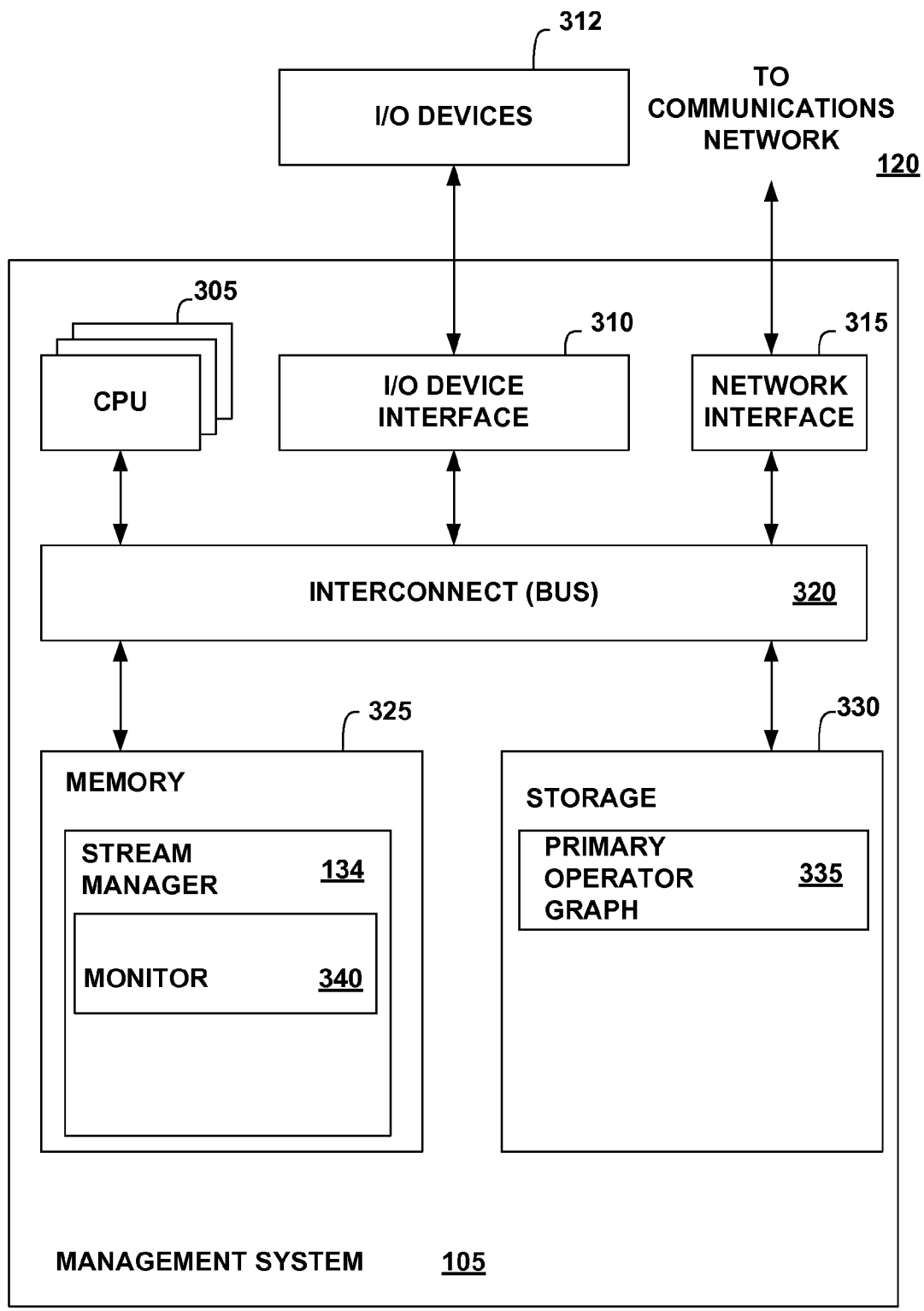
FIG. 3 illustrates a more detailed view of the management system of FIG. 1, according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 305, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing. The stream manager 134 may contain a monitor 340. The monitor 340 may examine the operator graph 132 to determine the amount of data being buffered on a stream operator. The monitor 340 may be a part of the stream manager 134 or act independently and may be discussed further in FIG. 7.

Figure 4:
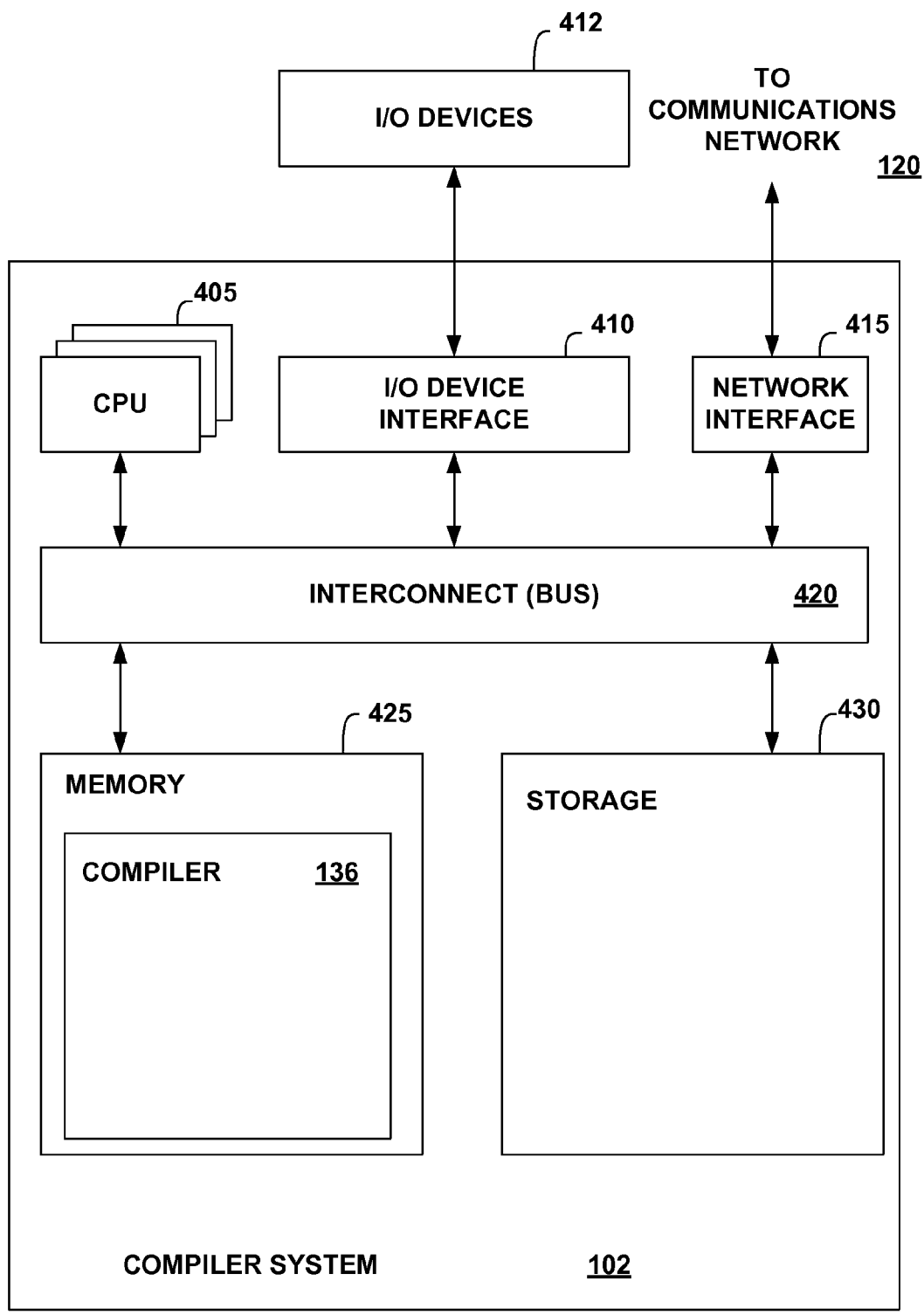
FIG. 4 illustrates a more detailed view of the compiler system of FIG. 1, according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the streaming application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
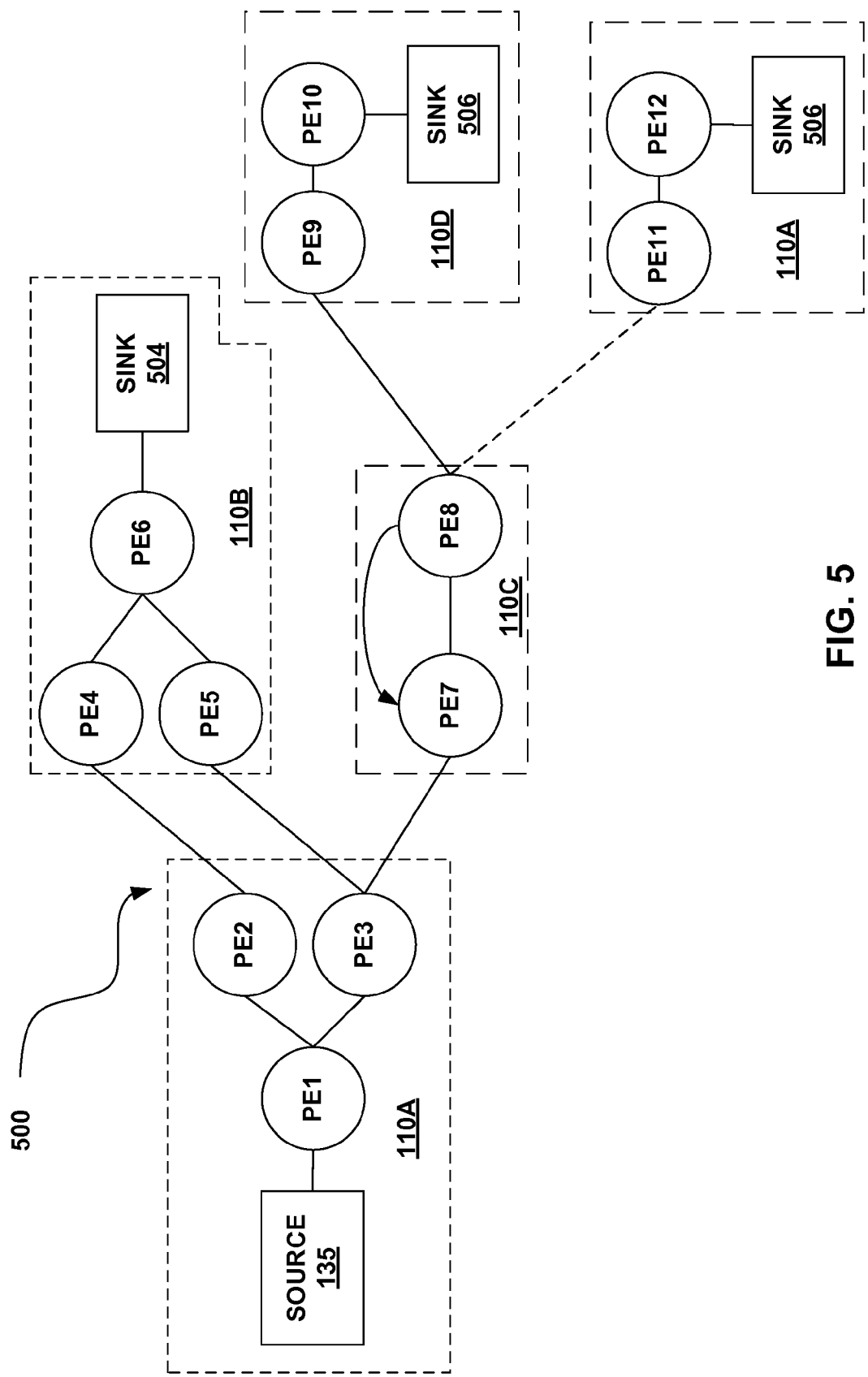
FIG. 5 illustrates an operator graph for a stream computing application, according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins).

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Data that flows to PE2 is processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

The present disclosure may be directed toward introducing delays into an aggregate stream operator. The aggregate stream operator may receive inputs from one or more upstream, input stream operators, e.g., stream operators 810-814 in FIG. 8. The aggregate stream operator may aggregate multiple data streams, but may also perform a sorting, or a joining function to the data streams. The aggregate stream operator may further transmit a processed stream to another stream operator. In some embodiments, there may be more than one aggregate stream operator.

Introducing delays to the aggregate stream operator may synchronize data streams and eliminate bottlenecks. For example, if there is a delay in processing or in the network, then a tuple at input stream operator A would take more time, than input stream operator B. If the aggregate stream operator must combine the two data streams from input stream operators A and B, then the aggregate stream operator would have to wait for the tuple from input stream operator A and the operator graph would slow. The performance of the operator graph may improve by introducing a delay pattern to the aggregate stream operator to process tuples from input stream operator A immediately and delay processing of tuples from input stream operator B.

Introducing delays to the aggregate stream operator may also reduce power consumption, which may allow for the deactivation of compute nodes or CPU cores. For example, if the data stream has a high rate of data transmitting from input stream operators to the aggregate stream operator, then delaying the processing may minimize processing that compute nodes, e.g., 110A-110D, would have to perform. The computing infrastructure 100 may be modified to deactivate one or more compute nodes to reduce energy usage, according to an embodiment.

Figure 6:
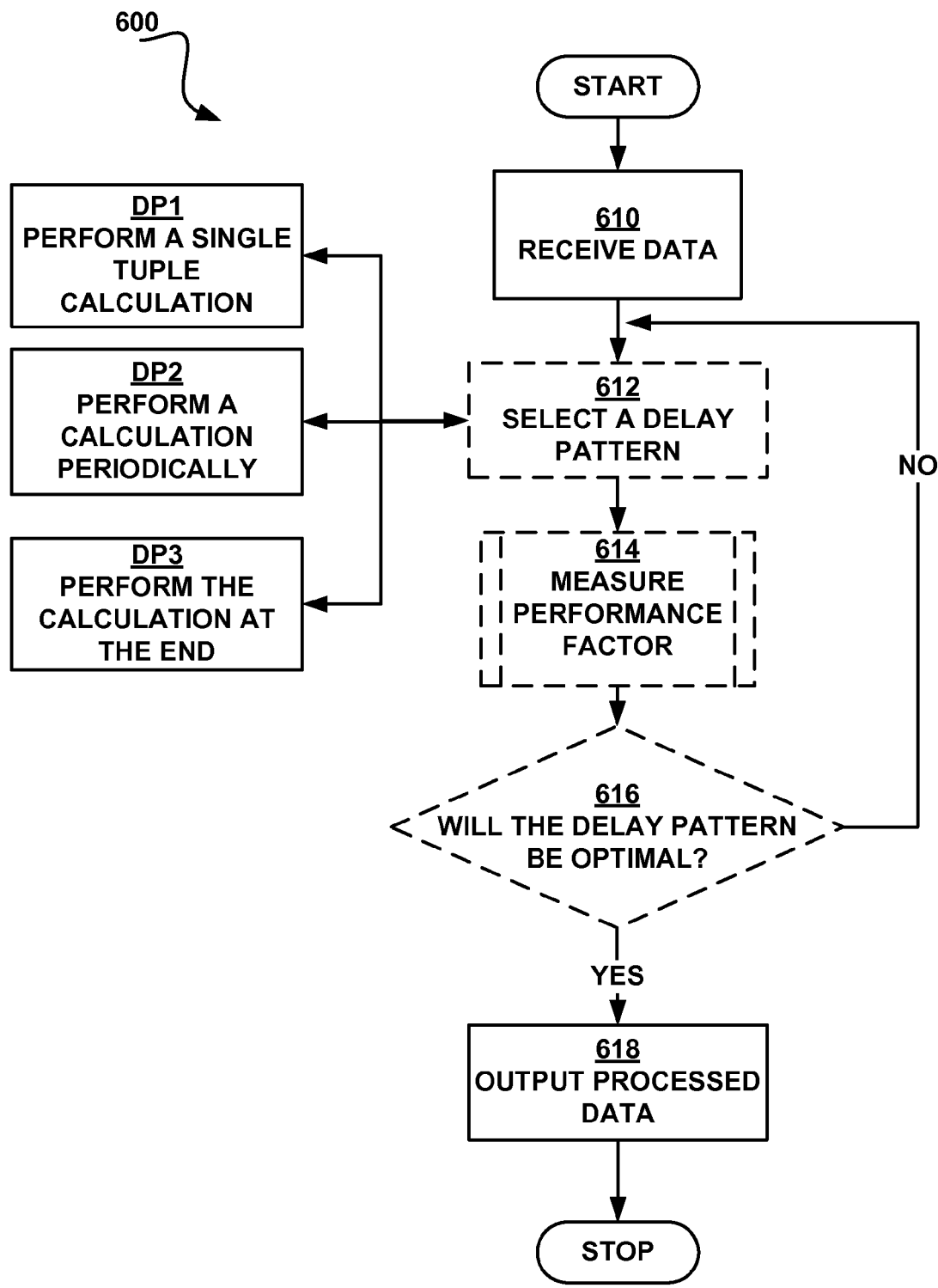
FIG. 6 illustrates a flowchart for selecting an optimal delay pattern, according to various embodiments.

FIG. 6 illustrates a flowchart of the method 600, according to various embodiments. The method 600 may begin at operation 610 where an aggregate stream operator, e.g., stream operator 816, receives data. After the data is received in operation 610, the stream manager 134 may select the delay pattern that the aggregate operator uses in operation 612.

The delay pattern may define when operations are performed by the aggregate stream operator. The aggregate stream operator may delay either the processing or the transmitting of the stream of tuples to a subsequent stream operator, e.g., stream operator 818. In DP1, which may also be referred to as the instantaneous delay pattern, the aggregate stream operator may perform a single tuple calculation. For example, the aggregate stream operator may perform a calculation on every single incoming tuple as it is received. In DP2, which may also be referred to as the periodic delay pattern, the aggregate stream operator may perform a calculation periodically. For example, the aggregate stream operator may hold the tuple in memory until five tuples are in the buffer or after a period of time. In some embodiments, the period may be further customized by the user. For example, the user may determine that the ideal period is 2 minutes between the hours of 0200 and 0300 but 4 minutes between the hours of 0400 and 0500.

In DP3, which may also be referred to as the holding delay pattern, the aggregate stream operator may hold all tuples in memory until the calculation can be applied to either all or an implied group of tuples. The implied group of tuples may be defined by the rate of data incoming or by the attributes. For example, the implied group of tuples may be defined by the number of times that a company's name comes up in a social media feed. If, under normal operation, a company's name comes up 100 times per minute, but reduces to 30 times per minute, then the decrease may indicate the end of the implied group. The parameters of the implied group may be further defined by a user. The user may be used generically to refer to an application programmer, database administrator, or end-user.

In operation 612, the delay pattern may be further selected based on a predetermined cycle. For example, delay pattern DP1 may first be selected by the aggregate stream operator. If the aggregate stream operator finds, e.g., that using delay pattern DP1 increases CPU usage beyond a threshold, then the aggregate stream operator may automatically select delay pattern DP2 for future data streams. Therefore, the predetermined cycle may be DP1, DP2, and DP3, according to various embodiments. In other embodiments, certain delay patterns may be removed or customized by the user. For example, the user may decide to first use delay pattern DP1 when there is an abundance of CPU capacity, but first use delay pattern DP3 if there is an abundance of memory capacity. In another embodiment, the delay pattern may be predicted and chosen by the stream manager 134 based on predicted performance (described in an embodiment below).

In another embodiment, a default delay pattern may be selected. For example, DP3 may be automatically selected unless the system is in a high memory-usage state. If the memory-usage is required to be lower, then the stream manager 134 may select another delay pattern, such as DP1.

After the delay pattern is chosen in operation 612, the operation proceeds to operation 614. In operation 614, the monitor 340 may measure performance factors that the stream operator (the structure further described in FIG. 8) may use to select the optimal delay pattern and will be further described in FIG. 7. The performance factors may be monitored by the monitor 340, which may be part of the stream manager 134.

After the performance factors are measured in operation 614, then the performance factors may, in one embodiment, be compared to a threshold value to determine if they are optimal in operation 616. In some embodiments, the threshold value may be the same as the optimal performance factor. In an embodiment, the delay pattern chosen may be may be determined by the optimal performance factor. The term "determined by" may also include scenarios where the measured performance factor is greater than, less than, equal to, or close to the optimal performance factor.

In an embodiment, the stream manager 134 may define optimal to mean that the performance factor is below the threshold for the performance factor. For example, the delay pattern DP3 may be selected in operation 612 and then the measured performance factor, e.g., CPU capacity, may be measured in operation 614. In operation 616, the measured performance factor, e.g., CPU capacity, may be higher than the threshold for the performance factor which would make the performance factor non-optimal. Therefore, another delay pattern may be selected in operation 612. The optimal performance factor may be established by the user in some embodiments. If the measured performance factors are close to the optimal performance factors, then operation 616 may proceed to operation 618. In operation 618, the stream of tuples from the aggregate stream operator, e.g., stream operator 816, may be transmitted to a receiving stream operator, e.g., stream operator 818, and the method 700 ends.

Although operation 612 proceeding operation 614 is illustrated in FIG. 6, other possibilities are possible. In the embodiment described below, operation 614 may be combined with portions of operation 616, which both precede operation 612. For example, the method 600 may first receive the data in operation 610. After the data is received, then operation may proceed to operation 614. In operation 614, the operator graph, e.g., operator graph 800, may be analyzed by the stream manager 134 or the monitor 340 to determine if the operator graph is running in a constrained environment. A constrained environment may be user-defined, or may indicate less than optimal performance of the computing infrastructure 100 or the operator graph.

Examples of a constrained environment may include a lack of CPU or memory capacity, or otherwise related to the computing infrastructure 100. Another example of a constrained environment may include an abundance of CPU or memory capacity where the user desires to deactivate portions of the computing infrastructure 100 The constrained environment may be defined by examining the performance factors in FIG. 7 or may be defined by the goals of the user. For example, a constrained environment may exist when the CPU usage is low but the user desires to shut down CPU cores.

Performance factors may be predicted in order to determine whether the constrained environment exists. For example, if the CPU usage is predicted to be high in a time range, then the stream manager 134 may determine that a constrained environment exists. In some embodiments, the performance factors may be predicted by examining historical performance with other delay patterns. For example, the delay pattern DP1 may have been used between the hours of 0900 and 1000 on a stream of tuples which resulted in a 2 GB memory usage. The streams manager 134 may determine that the situation is similar and predict that between the hours 0900 and 1000, selecting DP1 will require 2 GB of memory usage and compare the 2 GB value with a threshold. Likewise, the prediction may balance performance factors, e.g., higher memory usage in DP3 with higher CPU usage of DP1. After the performance factors are examined in operation 614, the operation 612 may select the delay pattern.

Figure 7:
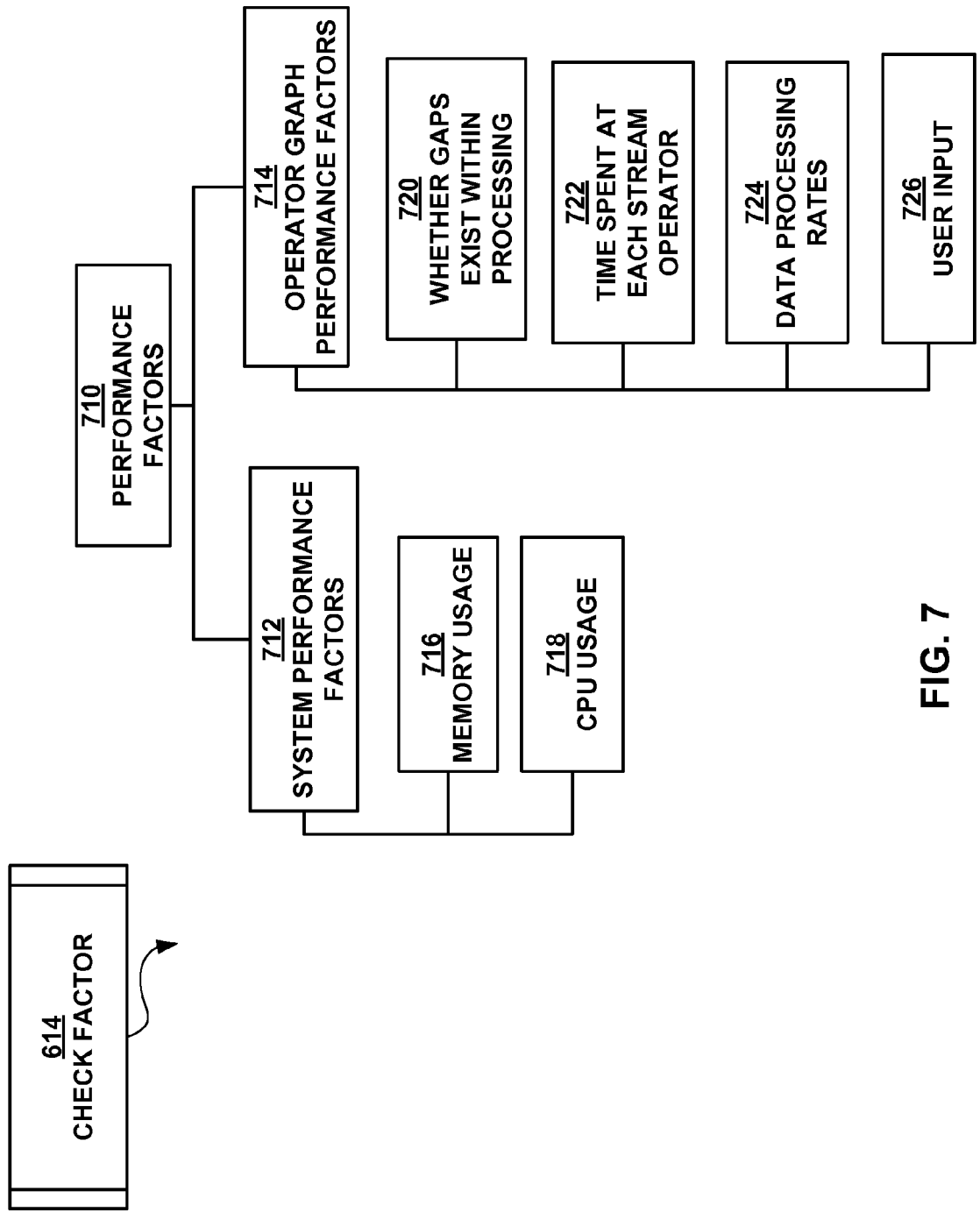
FIG. 7 illustrates factors used to determine if the delay pattern will be optimal, according to various embodiments.

FIG. 7 illustrates an example of the performance factors checked in operation 614, according to an embodiment. The stream manager 134 may examine the operator graph for performance factors 710. The performance factors 710 may measure the impact on system performance 712 or the impact on the operator graph performance 714.

The impact on system performance 712 may refer to the computing infrastructure 100 that contains one or more compute nodes. The performance may be measured on any of the one or more compute nodes, e.g. compute node 110A and compute node 110B, that are assigned portions of the operator graph, according to various embodiments. The system performance impact 712 may be measured by the management system 105, or monitor 340. Examples of monitoring the system performance factors 712 may include monitoring the memory usage 716 or the CPU usage 718 of the underlying compute node. In some embodiments, both the memory usage 716 and CPU 718 may be monitored. In other embodiments, the system performance may include the impact of the factor on other aspects, e.g., network connections in a distributed environment.

Factor 716 may be defined by a maximum memory associated with a stream operator. For example, the maximum memory may be a buffer size. For example, if the stream operator 616 is receiving two inputs of 5 kb/s and one input of 10 kb/s, the buffer size may increase at 5 kb/s. Once a maximum buffer size is reached, then the stream manager 134 may perform a calculation on a single tuple to reduce the memory buffer (which may also slow the system 600). Similarly, factor 718 may be defined by a maximum CPU usage. A stream operator may be allowed multiple threads, in some embodiments. For example, if the stream operator, e.g., stream operator 816, requires more processing than the CPU capacity, then the stream manager 134 may use delay pattern DP3 to delay the stream operator.

The operator graph performance impact 714 may also be measured. The operator graph performance may be measured using factors such as whether gaps exist within processing 720, time spent at each stream operator 722, data processing rates 724, or user input 726.

In factor 720, the stream manager 134 or monitor 340 may examine the incoming tuple rates to determine if gaps exist within the processing to perform some of the aggregation. Using the example above, if the data flow of the incoming tuples is not constant, then the monitor 340 may determine delays to the data stream, changes to the data rate, or patterns of delays in order to aggregate all the calculations between the delays. For example, if a tollbooth counts the number of cars and then aggregates counting data from multiple tollbooths in a separate stream operator, then the number of incoming counting of the cars may not be constant with delays during the non-rush hour times. In this case, e.g., the data may be aggregated every car during the non-rush hour times and every four cars during the rush hour times.

Factor 722 may be the time spent at each stream operator. For example, an aggregate stream operator, e.g., stream operator 810, may perform processing that takes 5 ms, but a first input stream operator, e.g., stream operator 812, may perform a process that takes 2 ms, and a second input stream operator, e.g., input stream operator 814, may perform a process that takes 8 ms. In this example, the aggregate stream operator may use delay pattern DP3 to ensure that the second input stream operator is done processing.

Factor 724 may relate to the data processing rates of the operator graph 800. For example, if in FIG. 8, the aggregate stream operator 816 may receive incoming tuples from input stream operator 810 at a rate of 10 kb/s, incoming tuples from input stream operator 812 at a rate of 8 kb/s, and incoming tuples from stream operator 814 at a rate of 4 kb/s, then the aggregate stream operator 616 may aggregate every 4 kb, i.e., periodically, if the aggregation takes 1 second so that the output is a constant 4 kb/s.

Factor 726 may relate to the user input. In some embodiments, the user may prioritize the performance factors. For example, the user may decide that the system performance factors 712 are more important than the operator graph performance factors 714 and assign a larger weight to all of the system performance factors 712. In other embodiments, the user may exclude memory usage, e.g., factor 716, if there is an excess of memory capacity.

Figure 8:
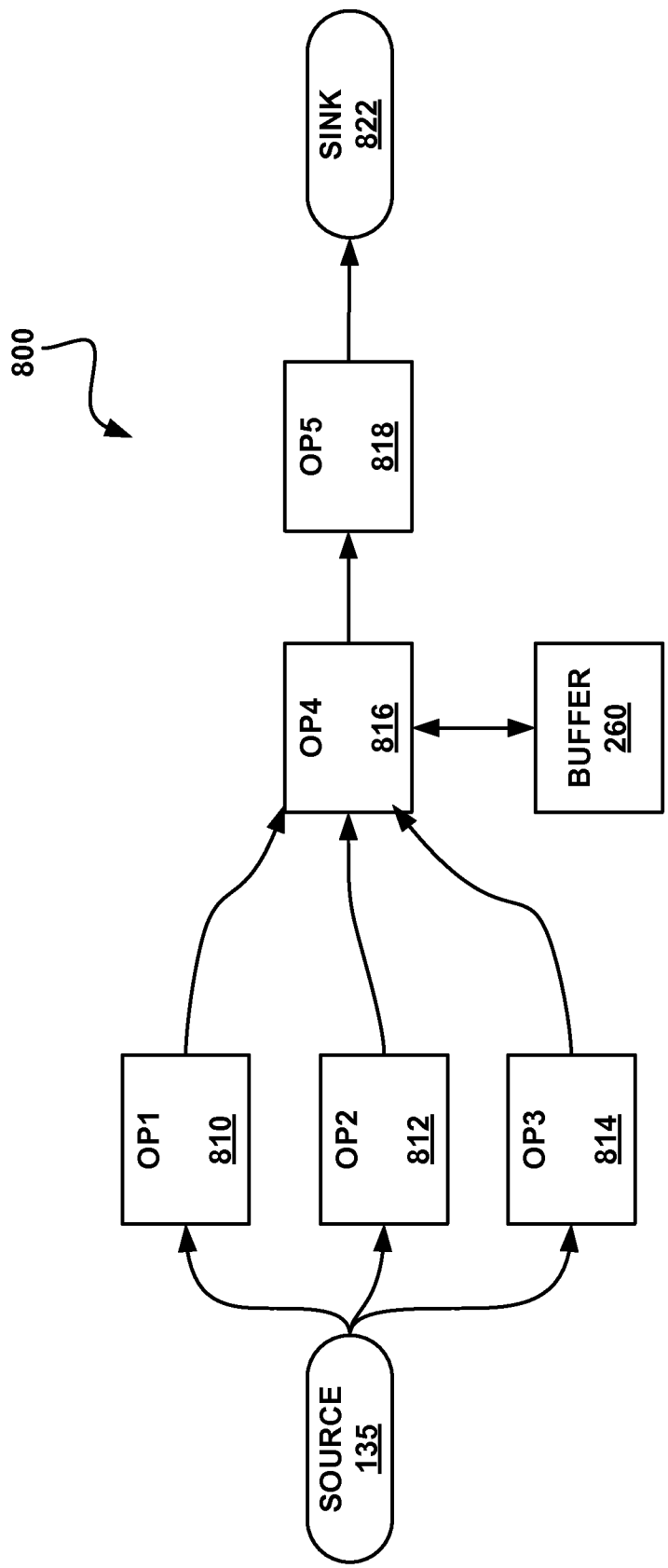
FIG. 8 illustrates an operator graph that includes implementation of a delay pattern, according to various embodiments.

FIG. 8 illustrates an operator graph 800 that utilizes delay pattern selection of tuples, according to some embodiments. In the operator graph 800, a tuple may be transmitted from a source 135 to one or more stream operators. In the shown example, a stream of tuples is transmitted to three input stream operators: stream operator 810; stream operator 812; and stream operator 814. The input stream operators 810-814 may perform one or more functions. For example, stream operator 810 may perform an aggregation function and stream operator 812 may perform a counting function. The input stream operators 810-814 may transmit to an aggregate stream operator, e.g., stream operator 816. The aggregate stream operator 816 may receive a stream of tuples from one or more stream operators. The aggregate stream operator 816 may perform processing on the stream of tuples received from the input stream operators 810-814.

In an embodiment, the aggregate stream operator 816 may delay transmission or delay processing in a delay pattern to the subsequent stream operator 818 based on instructions from the stream manager 134. The stream operator 818 may further transmit the data to a sink 820.

The aggregate stream operator 816 may include a buffer 260. The buffer 260 may be part of the aggregate stream operator 816 or shared with multiple stream operators. The buffer 260 may store attributes of a tuple or entire tuples. In some embodiments, the buffer 260 may store data before aggregation by the aggregate stream operator 816. In other embodiments, the buffer may store data after the aggregate stream operator 816 completes processing, e.g., calculations of the aggregate tuple data.

In an embodiment, the operator graph 800 may be used to track cars from a network of tollbooths. The individual tollbooths may count the number of cars that pass through the tollbooth and transmit this information to a stream operator, e.g., stream operator 810 may count cars from tollbooth A, stream operator 812 may count cars from tollbooth B, stream operator 814 may count cars from tollbooth C. The number of cars counted by the tollbooths A, B, and C may be transmitted by input stream operators 810-814 to an aggregate stream operator 816. The aggregate stream operator 816 may take an average of the number of cars that pass through the tollbooths A, B, and C. In order to save processing, the stream manager 134 may delay either the processing or the transmission of calculated data from aggregate stream operator 816 to subsequent stream operator 818. If the processing is delayed, the aggregate stream operator 816 may use the buffer 260 to store the number of cars as they come in. The aggregate stream operator 816 may also use delay pattern DP3 to get a more inclusive sample size for an average. In addition, if the processing of the average is delayed with delay pattern DP3, then the system 800 may deactivate processor 205 to save energy.

In another embodiment, the operator graph 800 may be used to monitor a social media feed of a trending news topic. The input stream operators may be used to track the news concerning a company. For example, the stream operator 810 may track the number of times that news about the company comes up on social media site A, while stream operator 812 examines the number of followers that a contributor has on social media site B, and stream operator 814 looks at the number of times that each contributor commented on the news about the company. The aggregate stream operator 816 may be used to determine the top four contributors of the news topics with the most followers. Since the number of followers is dynamic, a delay pattern may be used to improve the statistical quality of the data set. Since the operator graph 800 is acquiring data from two different data streams, with different network speeds, then the aggregate stream operator 816 may use delay pattern DP1 to gather more data from the slower stream of tuples, i.e., the input stream operator with the highest latency time, and improve the overall processing speed.

In another embodiment, the aggregate stream operator 816 or the streams manager 134 may modify the processing based on an outcome of the processing or the buffer 260. For example, using the social media example above, if the buffer becomes too large to track the top 4 contributors, then the stream manager 134 may direct stream operator 816 to measure the top three contributors instead.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language such as Java, Smalltalk, C++, or the like; (b) conventional procedural programming languages, such as the "C" programming language or similar programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A system for managing a stream of tuples, comprising:
one or more compute nodes operating in a computing infrastructure, a plurality of stream operators are assigned to the one or more compute nodes, the plurality of stream operators includes one or more input stream operators including:
a first input stream operator that outputs the stream of tuples to an aggregate stream operator at a first data rate, and
a second input stream operator that outputs the stream of tuples to the aggregate stream operator at a second data rate, a tuple from the stream of tuples is a sequence of one or more attributes,
the aggregate stream operator aggregates the first input stream operator and the second input stream operator,
a memory;
a computer processor communicatively coupled to the memory;
a stream manager communicatively coupled to the memory and the computer processor, wherein the stream manager is configured to:
select a first delay pattern for the aggregate stream operator, the first delay pattern is a pattern of time-based delays on the aggregate stream operator to change the first data rate of the stream of tuples from the first input stream operator to a third data rate, the first delay pattern defines when operations are performed by the aggregate stream operator, the first delay pattern includes a holding delay pattern that causes the stream manager to:
hold the stream of tuples in memory,
perform a calculation to an implied group of tuples from the stream of tuples in response to a presence of the implied group of tuples, the implied group of tuples is defined by a number of instances of an attribute shared between tuples in the stream of tuples;
measure one or more performance factors, a performance factor indicates a first performance of the computing infrastructure, wherein the performance factor also indicates an operator graph first performance, the operator graph first performance concerns the stream of tuples within the plurality of stream operators, the measuring one or more performance factors occurs by:
measuring a first time spent by a tuple from the first input stream operator at the first input stream operator and a second time spent by a tuple from the second input stream operator at the second input stream operator, and
determining whether gaps exist within processing of a tuple from the first input stream operator and a tuple from the second input stream operator, a gap indicates a non-constant first data rate from the first input stream operator with respect to the second data rate from the second input stream operator;
determine whether the first delay pattern is an optimal delay pattern, the optimal delay pattern changes the first performance of the computing infrastructure to a second performance of the computing infrastructure, the determining whether the first delay pattern is the optimal delay pattern occurs by:
determining that the first delay pattern is the optimal delay pattern in response to the tuple from the first input stream operator and the tuple from the second input stream operator having no gap, and
determining that the first delay pattern is the optimal delay pattern in response to the first time spent by the tuple from the first input stream operator being within a threshold value of the second time spent by the tuple from the second input stream operator; and
delay, in response to determining the optimal delay pattern, the stream of tuples from the aggregate stream operator to an output stream operator using the optimal delay pattern.

2. The system of claim 1, wherein the stream manager is configured to:
select, in response to not determining the optimal delay pattern, a second delay pattern for the aggregate stream operator; and
determine whether the second delay pattern is the optimal delay pattern.

3. The system of claim 2, wherein the stream manager is configured to select a second delay pattern by selecting the second delay pattern in a predetermined cycle.

4. The system of claim 1, wherein the first delay pattern causes the aggregate stream operator to perform a single tuple calculation by:
receiving a tuple from the stream of tuples, and
performing a calculation on the tuple from the stream of tuples as the tuple is received.

5. The system of claim 1, wherein the first performance and second performance is based on memory usage of the computing infrastructure.

6. The system of claim 5, wherein the memory usage is defined by usage of a maximum buffer size.

7. The system of claim 5, wherein the first performance and second performance is based on both memory usage and CPU usage of the computing infrastructure.

8. The system of claim 1, wherein the implied group of tuples is defined by a parameter that indicates a threshold number of times an attribute appears within the first data rate.

9. The system of claim 8, wherein the parameter is defined by a user.

10. A non-transitory computer program product for breakpoint prediction comprising a computer readable storage medium having a computer readable program stored therein, wherein the computer readable program, when executed on a computing device, causes the computing device to:
receive a stream of tuples to be processed by a plurality of stream operators,
the plurality of stream operators includes one or more input stream operators including:
a first input stream operator that outputs the stream of tuples to an aggregate stream operator at a first data rate, and
a second input stream operator that outputs the stream of tuples to the aggregate stream operator at a second data rate,
the aggregate stream operator aggregates the first input stream operator and the second input stream operator,
each stream operator from the plurality of stream operators are assigned to one or more compute nodes operating on one or more computer processors in a computing infrastructure, a tuple from the stream of tuples is a sequence of one or more attributes;
select a first delay pattern for the aggregate stream operator, the first delay pattern is a pattern of time-based delays on the aggregate stream operator to change the first data rate of the stream of tuples from the first input stream operator to a third data rate, the first delay pattern defines when operations are performed by the aggregate stream operator, the first delay pattern includes a holding delay pattern that causes the computing device to:

hold the stream of tuples in memory,
perform a calculation to an implied group of tuples from the stream of tuples in response to a presence of the implied group of tuples, the implied group of tuples is defined by a number of instances of an attribute shared between tuples in the stream of tuples;
measure one or more performance factors, a performance factor indicates a first performance of the computing infrastructure, wherein a performance factor also indicates an operator graph first performance, the operator graph first performance concerns the stream of tuples within the plurality of stream operators, the measuring one or more performance factors occurs by:
measuring a first time spent by a tuple from the first input stream operator at the first input stream operator and a second time spent by a tuple from the second input stream operator at the second input stream operator, and
determining whether gaps exist within processing of a tuple from the first input stream operator and a tuple from the second input stream operator, a gap indicates a non-constant first data rate from the first input stream operator with respect to the second data rate from the second input stream operator;
determine whether the first delay pattern is an optimal delay pattern, the optimal delay pattern changes the first performance of the computing infrastructure to a second performance of the computing infrastructure, the determining whether the first delay pattern is the optimal delay pattern occurs by:
determining that the first delay pattern is the optimal delay pattern in response to the tuple from the first input stream operator and the tuple from the second input stream operator having no gap, and
determining that the first delay pattern is the optimal delay pattern in response to the first time spent by the tuple from the first input stream operator being within a threshold value of the second time spent by the tuple from the second input stream operator; and
delay, in response to determining the optimal delay pattern, the stream of tuples from the aggregate stream operator to an output stream operator using the optimal delay pattern.

11. The computer program product of claim 10, wherein the computer readable program causes the computing device to:
selecting, in response to not determining the optimal delay pattern, a second delay pattern for the aggregate stream operator; and
determining whether the second delay pattern is the optimal delay pattern.

12. The computer program product of claim 11, wherein the selecting a second delay pattern occurs in a predetermined cycle.

13. The computer program product of claim 10, wherein the first delay pattern causes the aggregate stream operator to perform a single tuple calculation by:
receiving a tuple from the stream of tuples, and
performing a calculation on the tuple from the stream of tuples as the tuple is received.

14. The computer program product of claim 10, wherein the first performance and second performance is based on memory usage of the computing infrastructure.

15. The computer program product of claim 10, wherein the implied group of tuples is defined by a parameter that indicates a threshold number of times an attribute appears in the stream of tuples.

16. The computer program product of claim 15, wherein the parameter is defined by a user.

* * * * *